United States Patent
Ishida et al.

(10) Patent No.: US 11,971,510 B2
(45) Date of Patent: Apr. 30, 2024

(54) GEL DOSIMETER FOR MEASURING RADIATION DOSE

(71) Applicants: RIKEN, Wako (JP); NISSAN CHEMICAL CORPORATION, Tokyo (JP)

(72) Inventors: Yasuhiro Ishida, Wako (JP); Yoshihiro Kudo, Funabashi (JP)

(73) Assignees: RIKEN, Saitama (JP); NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/254,943

(22) PCT Filed: Nov. 25, 2021

(86) PCT No.: PCT/JP2021/043270
§ 371 (c)(1),
(2) Date: Aug. 30, 2023

(87) PCT Pub. No.: WO2022/114081
PCT Pub. Date: Jun. 2, 2022

(65) Prior Publication Data
US 2024/0012165 A1 Jan. 11, 2024

(30) Foreign Application Priority Data
Nov. 27, 2020 (JP) ................................. 2020-197636

(51) Int. Cl.
*G01T 1/04* (2006.01)
(52) U.S. Cl.
CPC .................... *G01T 1/04* (2013.01)

(58) Field of Classification Search
CPC ........................................................ G01T 1/04
(Continued)

(56) References Cited

U.S. PATENT DOCUMENTS

| 5,321,357 A * | 6/1994 | Maryanski | G01R 33/28 324/300 |
| 6,621,086 B1 * | 9/2003 | Appleby | G01T 1/04 250/580 |

(Continued)

FOREIGN PATENT DOCUMENTS

| JP | S62-83684 A | 4/1987 |
| JP | 2012-002669 A | 1/2012 |

(Continued)

OTHER PUBLICATIONS

Zahra Alyani Nezhad and Ghazale Geraily, A review study on application of gel dosimeters in low energy radiation dosimetry, Applied Radiation and Isotopes, vol. 179, Jan. 2022, 110015. (Year: 2022).*

(Continued)

*Primary Examiner* — Allen C. Ho
(74) *Attorney, Agent, or Firm* — Oliff PLC (57) ABSTRACT

A gel dosimeter for radiation dosimetry includes a radically polymerizable monomer, a gelator, glucose, and glucose oxidase. Although a conventional polymer gel dosimeter contains a deoxygenating agent such as tetrakis(hydroxymethyl)phosphonium chloride, such a deoxygenating agent fails to exhibit sufficient effects. Thus, a more effective deoxygenation treatment technique has been required for a gel dosimeter.

13 Claims, 2 Drawing Sheets

(58) Field of Classification Search
USPC ........ 378/65, 98.8; 250/370.09, 482.1, 484.5
See application file for complete search history.

(56) References Cited

U.S. PATENT DOCUMENTS

| | | | |
|---|---|---|---|
| 8,586,366 | B2 | 11/2013 | Hiroki et al. |
| 9,213,105 | B2 * | 12/2015 | Maeyama ................. G01T 1/04 |
| 9,357,925 | B2 * | 6/2016 | Adamovics .......... A61B 5/0073 |
| 10,031,241 | B2 * | 7/2018 | Maeyama .............. G01T 1/167 |
| 11,099,278 | B2 * | 8/2021 | Bleuse .................. G01N 21/47 |
| 11,150,358 | B2 * | 10/2021 | Maeyama ............. C09K 11/02 |
| 11,442,181 | B2 * | 9/2022 | Maeyama ................. G01T 1/02 |
| 2011/0312097 | A1 | 12/2011 | Hiroki et al. |
| 2014/0295564 | A1 | 10/2014 | Maeyama et al. |

FOREIGN PATENT DOCUMENTS

| | | |
|---|---|---|
| JP | 5590526 B2 | 9/2014 |
| JP | 2014-185969 A | 10/2014 |
| JP | 2014-209093 A | 11/2014 |
| JP | 2020-062843 A | 4/2020 |
| WO | 2020/080113 A1 | 4/2020 |

OTHER PUBLICATIONS

C. Baldock et al., Topical Review: Polymer gel dosimetry, Phys. Med. Biol. Feb. 11, 2010; 55(5): R1-R63. (Year: 2010).*

Gladman et al.; "Biomimetic 4D printing;" Nature Materials; 2016; pp. 413-419; vol. 15.

Jan. 25, 2022 Search Report issued in International Patent Application No. PCT/JP2021/043270.

Jan. 25, 2022 Written Opnion of the International Searching Authority issued in International Patent Application No. PCT/JP2021/043270.

* cited by examiner

GEL DOSIMETER FOR MEASURING RADIATION DOSE

TECHNICAL FIELD

The present invention relates to a gel dosimeter used for a radiation dosimeter. More particularly, the present invention relates to a polymer gel dosimeter for radiation dosimetry to verify a three-dimensional dose distribution in a radiation therapy regimen for cancer, etc.

BACKGROUND ART

Radiation therapies for cancer that have been introduced include high-precision therapies, such as stereotactic radiation therapy (SRT); i.e., pinpoint radiation therapy, and intensity modulated particle therapy (IMPT), which can achieve three-dimensional setting of an irradiation field along the contour of a cancer by changing a dose intensity in the same irradiation field. In such a therapy, the integrated value (i.e., dose distribution) of the amount of microscopic energy applied to each three-dimensional position of the target is precisely adjusted. A particle beam therapy has also been performed, which utilizes charged particle beams with high dose concentration, such as proton beams or heavy particle beams (e.g., carbon beams or neon beams). The particle beam therapy is advantageous in that a tumor can be treated through control of the position of radiation exposure and the dose of radiation with higher precision than a conventional X-ray therapy. The particle beam therapy is required to properly release energy from particle beams at the position of a target (e.g., a lesion in a living tissue) and also to have as little effect as possible on a normal tissue around the target. For these purposes, the radial spread of particle beams and the position of the Bragg peaks of particle beams are controlled with respect to the target position in the irradiated body.

In a practical radiation therapy regimen, the dose distribution is optimized at each three-dimensional position in a living tissue. In a typical therapy regimen, the dose distribution (radiation doses to each position) in the target tissue is varied in accordance with the purpose of the therapy, as well as the influence of the radiation on the surrounding normal tissues is reduced, and the influence of the radiation on an organ at risk is also reduced to a minimum possible level. In order to achieve such a complicated-shaped dose distribution, beams may be precisely controlled and irradiated from multiple directions. This control is performed with a filter or a collimator (e.g., a range shifter, a multi-leaf collimator, or a bolus) that is adjusted in accordance with the irradiated body. In order to realize highly controlled radiation therapy, advanced quality assurance and quality control (hereinafter abbreviated as "QA/QC") are required for the entire device including a radiation exposure device, an auxiliary, a filter, a collimator, etc., and for the irradiation process by such a device.

Such a therapy regimen and the QA/QC of various devices require a technique capable of appropriately integrating and actually measuring the amount of energy applied by a large amount of ionizing radiations incident from different directions at various acceleration energies. This is because, if the amount of energy applied can be integrated and the dose can be measured precisely at each position, the three-dimensional distribution of the amount of energy applied (dose distribution), which supports the aforementioned QA/QC, can be measured. For this purpose, a one-dimensional, two-dimensional, or pseudo three-dimensional (placement of a detector on an orthogonal plane or a cylinder) dosimeter, such as an ionization chamber dosimeter, a film, or a semiconductor detector, has conventionally been used. In such a dosimeter, the aforementioned dose distribution with respect to one-dimensional or two-dimensional coordinates is actually measured in the region where particle beams are aligned with the target position. In recent years, besides these dosimeters, attention has been paid to a gel dosimeter capable of measuring a three-dimensional dose distribution with use of the measurement principle of a chemical dosimeter. The use of a gel dosimeter is advantageous in that the amount of energy applied by radiation at each position of water (i.e., a material that can be regarded as equivalent to a living organism) can be accurately measured; i.e., the influence of radiation can be measured in a bioequivalent substance or a water-equivalent substance. The gel dosimeter can acquire a three-dimensional dose distribution while the dosimeter itself is used as a solid phantom.

Hitherto reported gel dosimeters capable of measuring a three-dimensional dose distribution include a Fricke gel dosimeter (Patent Document 1), a polymer gel dosimeter (Patent Documents 2 and 3), and a dye gel dosimeter. A Fricke gel dosimeter is composed of a gel containing a solution (an aqueous solution containing ferrous sulfate) of a Fricke dosimeter known as a liquid chemical dosimeter, and utilizes absorbed-dose-proportional enhancement of oxidation reaction (from divalent to trivalent) of iron (coloring) in association with radiation exposure. Meanwhile, a polymer gel dosimeter is prepared by dispersion of a monomer in a gel. In the polymer gel dosimeter, a polymer is formed in a dose-proportional manner upon radiation exposure, and the relaxation time of water changes in the irradiated portion. Thus, the dose can be estimated through reading by MRI (magnetic resonance imaging). Also, portions that have become clouded by radiation exposure can be detected with an optical CT device. The polymer produced by radiation exposure is less likely to be diffused in the gel, and clouding is stable over time. In addition, the clouded portions seem to float in the transparent gel. Therefore, the polymer gel dosimeter is characterized by its superior visuality.

Hydrogels produced by using glucose and glucose oxidase as deoxygenating agents have been reported (Non-Patent Document 1).

PRIOR ART DOCUMENTS

Patent Documents

Patent Document 1: JP 2014-209093 A
Patent Document 2: JP 5590526 B
Patent Document 3: JP 2014-185969 A

Non-Patent Documents

Non-Patent Document 1: Nature Materials (2016), 15, 413-418

SUMMARY OF THE INVENTION

Problems to be Solved by the Invention

A conventional polymer gel dosimeter contains a water-soluble polymerizable monomer such as methacrylic acid or acrylamide. Since the polymerization reaction of such a polymerizable monomer is inhibited by the presence of oxygen ($O_2$) in the reactant, the reaction generally involves deoxygenation treatment. Although a conventional polymer gel dosimeter contains a deoxygenating agent such as tetrakis(hydroxymethyl)phosphonium chloride, sodium ascorbate, or copper sulfate, such a deoxygenating agent fails to exhibit sufficient effects. Thus, a more effective deoxygenation treatment technique has been required for a polymer gel dosimeter.

A polymer gel dosimeter is read by MRI after radiation exposure. Although radiation exposure and MRI are performed at room temperature, a conventional gel dosimeter must be stored in a refrigerator when it is not subjected to these operations. Thus, a conventional gel dosimeter poses a problem that it cannot be stored at room temperature. Hydrogel is a material that can be used as a refrigerant, and it takes several hours to one night for bringing it back to room temperature from a refrigerated state. Thus, hydrogel faces a problem that, for example, it must be taken out of a refrigerator the day before use.

Means for Solving the Problems

The present inventors have conducted extensive studies on an effective deoxygenation treatment for a gel dosimeter, and as a result have found that the deoxygenation can be performed by a method involving the addition of glucose and glucose oxidase. The present invention has been accomplished on the basis of this finding.

Accordingly, a first aspect of the present invention is a gel dosimeter for radiation dosimetry comprising a radically polymerizable monomer, a gelator, glucose, and glucose oxidase.

A second aspect of the present invention is the gel dosimeter for radiation dosimetry according to the first aspect, wherein the gelator is one or more selected from the group consisting of gelatin, agarose, xanthan gum, carrageenan, gellan gum, chitosan, and alginic acid, and sodium, potassium, magnesium, and calcium salts thereof, including partially neutralized products thereof.

A third aspect of the present invention is the gel dosimeter for radiation dosimetry according to the first aspect, wherein the gelator contains polyvinyl alcohol and glutaraldehyde or borax.

A fourth aspect of the present invention is the gel dosimeter for radiation dosimetry according to the first aspect, wherein the gelator contains a water-soluble organic polymer (A) having an organic acid structure, an organic acid salt structure, or an organic acid anion structure, a silicate salt (B), and a dispersant (C) for the silicate salt.

A fifth aspect of the present invention is the gel dosimeter for radiation dosimetry according to the fourth aspect, wherein the water-soluble organic polymer (A) is a completely neutralized or partially neutralized polyacrylic acid salt having a weight average molecular weight of 1,000,000 to 10,000,000, or a mixture thereof.

A sixth aspect of the present invention is the gel dosimeter for radiation dosimetry according to the fourth or fifth aspect, wherein the silicate salt (B) is one or more water-swellable silicate salts selected from the group consisting of smectite, bentonite, vermiculite, and mica.

A seventh aspect of the present invention is the gel dosimeter for radiation dosimetry according to any one of the fourth to sixth aspects, wherein the dispersant (C) is one or more selected from the group consisting of sodium orthophosphate, sodium pyrophosphate, sodium tripolyphosphate, sodium tetraphosphate, sodium hexametaphosphate, sodium polyphosphate, sodium etidronate, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, sodium ligninsulfonate, and potassium salts corresponding to these salts.

An eighth aspect of the present invention is the gel dosimeter for radiation dosimetry according to any one of the first to seventh aspects, wherein the radically polymerizable monomer is a water-soluble polymerizable monomer.

A ninth aspect of the present invention is the gel dosimeter for radiation dosimetry according to any one of the first to eighth aspects, wherein the gel dosimeter further comprises a water-soluble polyfunctional acrylamide monomer as a crosslinking agent.

A tenth aspect of the present invention is the gel dosimeter for radiation dosimetry according to any one of the first to ninth aspects, wherein the gel dosimeter further comprises water-dispersible inorganic microparticles as a sensitizer.

An eleventh aspect of the present invention is the gel dosimeter for radiation dosimetry according to any one of the first to tenth aspects, wherein the gel dosimeter further comprises, as a stabilizer, a polymerization inhibitor, a radical scavenger, or an antioxidant.

A twelfth aspect of the present invention is the gel dosimeter for radiation dosimetry according to any one of the first to eleventh aspects, wherein the gel dosimeter further comprises a buffer.

A thirteenth aspect of the present invention is the gel dosimeter for radiation dosimetry according to the twelfth aspect, wherein the buffer is one or more selected from the group consisting of phosphoric acid, citric acid, acetic acid, boric acid, tartaric acid, salts of these, Tris, and HEPES.

Effects of the Invention

The gel dosimeter of the present invention prepared through deoxygenation treatment exhibits an excellent deoxygenation effect, as compared with a deoxygenating agent widely used in conventional gel dosimeters, such as tetrakis(hydroxymethyl)phosphonium chloride, sodium ascorbate, or copper sulfate.

The gel dosimeter of the present invention prepared through deoxygenation treatment may involve the use of various gelators, including widely used gelatin or agarose, a water-soluble organic polymer, a hydrogel containing a silicate salt and a dispersant for the silicate salt, and a hydrogel containing polyvinyl alcohol and glutaraldehyde or borax.

The gel dosimeter of the present invention prepared through deoxygenation treatment can be stored at room temperature without the need for refrigerated storage before and after a polymerization reaction unlike conventional cases.

MODES FOR CARRYING OUT THE INVENTION

The gel dosimeter of the present invention contains, as components, a deoxygenating agent, a gelator, a crosslinking agent, and a radically polymerizable monomer. If necessary, the gel dosimeter may contain, besides the aforementioned components, an additional component such as a sensitizer or stabilizer, so long as the intended effects of the present invention are not impaired.

[Deoxygenating Agent]

The deoxygenating agent may be a combination of glucose and glucose oxidase. The amount of glucose is 0.01% by mass to 10% by mass, preferably 0.1% by mass to 5% by mass, more preferably 0.5% by mass to 3% by mass, relative to 100% by mass of the gel dosimeter. The titer of glucose oxidase is 10 units/g to 1,000,000 units/g, preferably 100 units/g to 500,000 units/g, more preferably 1,000 units/g to 300,000 units/g, wherein 1 unit corresponds to the amount required for oxidizing 1.0 μmol of β-D-glucose into D-gluconolactone and hydrogen peroxide within one minute at 25° C. and pH 7.0. The amount of glucose oxidase is 0.1 ppm to 10,000 ppm, preferably 0.5 ppm to 5,000 ppm, more preferably 1 ppm to 1,000 ppm, relative to 100% by mass of the gel dosimeter. Catalase may also be added to decompose hydrogen peroxide generated during glucose oxidation. The optimal pH for glucose oxidase is 5 to 7, and a buffer may be added if desired. Examples of the buffer include phosphoric acid, citric acid, acetic acid, boric acid, tartaric acid, salts of these, Tris, and HEPES.

[Gelator]

The gelator used may be one which gelates at room temperature, is at such a level that it can be used in a gel dosimeter, and does not inhibit the radical polymerization of a radically polymerizable monomer by radiation exposure. A gelator used in a polymer gel dosimeter may be used.

Examples of the gelator include gelatin, agarose, xanthan gum, carrageenan, gellan gum, chitosan, and alginic acid, which are natural polymers derived from animals and plants, and sodium, potassium, magnesium, and calcium salts thereof, including partially neutralized products thereof; a gel-forming composition containing a water-soluble organic polymer (A) having an organic acid structure, an organic acid salt structure, or an organic acid anion structure, a silicate salt (B), and a dispersant (C) for the silicate salt; and a gel-forming composition containing polyvinyl alcohol and glutaraldehyde or borax.

The amount of the natural polymer is 0.01% by mass to 30% by mass, preferably by mass to 20% by mass, relative to 100% by mass of the gel dosimeter.

Examples of the water-soluble organic polymer (A) having an organic acid salt structure or an organic acid anion structure include water-soluble organic polymers having a salt structure or anion structure of an organic acid group such as a carboxyl group, a sulfonyl group, or a phosphonyl group.

Examples of the water-soluble organic polymer include those having a carboxyl group, such as salts of poly(meth)acrylic acid, carboxyvinyl polymer, and carboxymethylcellulose; those having a sulfonyl group, such as salts of polystyrene sulfonic acid; and those having a phosphonyl group, such as polyvinyl phosphonates. Preferred is a salt of polyacrylic acid.

The water-soluble organic polymer (A) has a weight average molecular weight of preferably 1,000,000 or more and 10,000,000 or less, for example, 2,500,000 or more and or less.

The water-soluble organic polymer (A) preferably has a linear-chain structure and has neither a branched structure nor a chemically crosslinked structure.

The water-soluble organic polymer (A) having an organic acid structure may be a completely neutralized or partially neutralized polymer having an organic acid group.

Examples of the organic acid salt structure include sodium salts, ammonium salts, potassium salts, and lithium salts of organic acid groups.

Examples of the organic acid anion structure include structures formed by dissociation of cations from organic acid groups or organic acid salts.

The water-soluble organic polymer (A) may be, for example, a completely neutralized or partially neutralized organic polymer having an organic acid group, or a mixture of such polymers.

The water-soluble organic polymer (A) is, for example, completely neutralized or partially neutralized linear-chain sodium polyacrylate.

The amount of the aforementioned water-soluble organic polymer (A) is 0.01% by mass to 20% by mass, preferably 0.05% by mass to 10% by mass, relative to 100% by mass of the gel dosimeter.

Examples of the aforementioned silicate salt (B) include particles of water-swellable silicate salts, such as smectite, bentonite, vermiculite, and mica. The silicate salt (B) preferably forms a colloid with water or a water-containing liquid serving as a dispersion medium.

Primary particles of the silicate salt are in, for example, a disc-like, plate-like, spherical, particulate, cubic, acicular, rod-like, or amorphous form. For example, the silicate salt is preferably in the form of disk-like or plate-like particles having a diameter of 5 nm to 1,000 nm. Specific examples of the silicate salt include layered silicate salts. Examples of readily available commercial products include LAPONITE XLG (synthetic hectorite), LAPONITE XLS (synthetic hectorite containing sodium pyrophosphate as a dispersant), LAPONITE XL21 (sodium magnesium fluorosilicate), LAPONITE RD (synthetic hectorite), LAPONITE RDS (synthetic hectorite containing an inorganic polyphosphate salt as a dispersant), and LAPONITE 5482 (synthetic hectorite containing sodium etidronate as a dispersant) available from BYK Additives & Instruments; KUNIPIA (montmorillonite), SUMECTON SA (synthetic saponite), SUMECTON ST (synthetic saponite), SUMECTON SWN (synthetic smectite), and SUMECTON SWF (synthetic smectite) available from Kunimine Industries Co., Ltd.; and BEN-GEL (purified product of natural bentonite) available from HOJUN Co., Ltd.

The amount of the aforementioned silicate salt (B) is 0.01% by mass to 20% by mass, preferably 0.05% by mass to 10% by mass, relative to 100% by mass of the gel dosimeter.

The dispersant (C) for the silicate salt may be a dispersant or deflocculant used for the purpose of improvement of the dispersibility of a silicate salt or exfoliation of a layered silicate salt. The dispersant (C) may be, for example, a phosphate salt dispersant, a carboxylate salt dispersant, a dispersant acting as an alkali, or an organic deflocculant.

Examples of the phosphate salt dispersant include sodium orthophosphate, sodium pyrophosphate, sodium tripolyphosphate, sodium tetraphosphate, sodium hexametaphosphate, sodium polyphosphate, and sodium etidronate. Examples of the carboxylate salt dispersant include sodium poly(meth)acrylate, ammonium poly(meth)acrylate, sodium acrylate/sodium maleate copolymers, and ammonium acrylate/ammonium maleate copolymers. Examples of the dispersant acting as an alkali include sodium hydroxide and hydroxylamine. Examples of the dispersant that reacts with a polyvalent cation to form an insoluble salt or a complex salt include sodium carbonate and sodium silicate. Examples of the organic deflocculant include polyethylene glycol, polypropylene glycol, sodium humate, and sodium ligninsulfonate. Other examples include phosphate salt dispersants such as potassium salts. Preferably, the phosphate salt dispersant is sodium pyrophosphate; the carboxylate salt dispersant is low-polymerization sodium polyacrylate having a weight average molecular weight of 1,000 to 20,000; and the organic deflocculant is polyethylene glycol (e.g., PEG 900).

The low-polymerization sodium polyacrylate is known to act as a dispersant through, for example, a mechanism by which the low-polymerization sodium polyacrylate interacts with silicate salt particles to generate carboxy anion-derived negative charges on the surfaces of the particles, to thereby disperse the silicate salt by charge repulsion.

The amount of the dispersant (C) is 0.01% by mass to 20% by mass, preferably by mass to 10% by mass, more preferably 0.5% by mass to 5% by mass, relative to 100% by mass of the gel dosimeter.

When the silicate salt used is in the form of a product containing a dispersant, the dispersant is not necessarily further added.

As described above, one example of the gelator is a gel-forming composition containing polyvinyl alcohol and glutaraldehyde or borax. The polyvinyl alcohol has a degree of polymerization of 10 to 8,000, preferably 100 to 5,000, more preferably 500 to 3,000, and a degree of saponification of 80% to 99%, preferably 88% to 99%.

[Crosslinking Agent]

The crosslinking agent is preferably a water-soluble polyfunctional acrylamide monomer, in particular, N,N'-methylenebisacrylamide, FAM-301, FAM-401, and FOM-03006 (available from FUJIFILM Wako Pure Chemical Corporation). The amount of the crosslinking agent is 0.01% by mass to 20% by mass, preferably 0.1% by mass to 10% by mass, more preferably 0.5% by mass to 5% by mass, relative to 100% by mass of the gel dosimeter.

[Radically Polymerizable Monomer]

The gel dosimeter for radiation dosimetry of the present invention may contain a radically polymerizable monomer utilizing a mechanism by which radicals are generated in the monomer through radiation exposure, and the degree of polymerization through reaction caused by the radicals corresponds to the dose. Thus, the gel dosimeter of the present invention contains a radiation dosimetry gel as a material for radiation dosimetry.

[Water-Soluble Polymerizable Monomer]

The aforementioned radically polymerizable monomer may be a water-soluble polymerizable monomer.

Examples of the water-soluble polymerizable monomer include compounds having an acrylic structure or a vinyl structure.

Examples of the water-soluble polymerizable monomer include (meth)acrylic acid, (meth)acrylamide, hydroxyethyl (meth)acrylate, N,N-dimethyl(meth)acrylamide, N,N-diethyl(meth)acrylamide, 4-(meth)acryloylmorpholine, N-vinylpyrrolidone, and N-vinylacetamide. The aforementioned water-soluble polymerizable monomers may be used alone or in combination of two or more species. The amount of the water-soluble polymerizable monomer is 0.01% by mass to 30% by mass, preferably 0.1% by mass to 20% by mass, more preferably 0.5% by mass to 15% by mass, relative to 100% by mass of the gel dosimeter.

[Sensitizer]

The gel dosimeter may contain a magnesium salt or water-dispersible inorganic microparticles having the effect of enhancing radiation sensitivity. The enhancement of radiation sensitivity by a magnesium salt is disclosed in the literature (Radiological Physics and Technology (2018) 11: 375-381). Examples of the magnesium salt include magnesium chloride and magnesium sulfate. The amount of the magnesium salt is 0.1% by mass to 50% by mass, preferably 0.5% by mass to 25% by mass, more preferably 1% by mass to 10% by mass, relative to 100% by mass of the gel dosimeter. Examples of the water-dispersible inorganic microparticles include silica sol, alumina sol, and zirconia sol. Examples of readily available commercial products include SNOWTEX (silica sol, available from Nissan Chemical Corporation), SILICADOL (silica sol, available from NIPPON CHEMICAL INDUSTRIAL CO., LTD.), and Quartron (silica sol, available from FUSO CHEMICAL CO., LTD.). The amount of the water-dispersible inorganic microparticles is 0.01% by mass to 50% by mass, preferably 0.05% by mass to 10% by mass, more preferably 0.1% by mass to 5% by mass, relative to 100% by mass of the gel dosimeter.

[Stabilizer]

The gel dosimeter may contain a stabilizer for preventing deterioration or deactivation of the dosimeter before radiation exposure. Examples of the stabilizer include a polymerization inhibitor, a radical scavenger, and an antioxidant, such as hydroquinone, 4-methoxyphenol, and N,N'-diisobutyl-p-phenylenediamine. The amount of the stabilizer is 0.1 ppm to 10,000 ppm, preferably 1 ppm to 5,000 ppm, more preferably 10 ppm to 3,000 ppm, relative to 100% by mass of the gel dosimeter.

[Production Method for Gel Dosimeter and Gel (Gelator)]

No particular limitation is imposed on the production methods for the gel dosimeter and gel of the present invention. For example, a homogeneous solution or a transparent dispersion may be prepared by mixing a monomer that can be polymerized through radiation exposure and a gelator in predetermined proportions, and mixing the resultant mixture with a crosslinking agent, a sensitizer, and, if desired, an additional component such as a deoxygenating agent, a stabilizer, or a buffer.

Each component may be used after being dissolved or dispersed in a solvent as appropriate. No particular limitation is imposed on the solvent, so long as it can dissolve or homogeneously disperse the respective components of the gel dosimeter. The solvent is preferably water. Water may be mixed with an aqueous solvent such as methanol, ethanol, isopropanol, or glycerol.

When the gelator used is a gel-forming composition containing the components (A) to (C), the gel dosimeter may be produced by the following method. For example, two of the components (A) to (C) are mixed to thereby prepare a homogeneous solution, and then the remaining component and a monomer are added to the solution. Thereafter, the resultant mixture is mixed with a crosslinking agent, a sensitizer, and, if desired, an additional component such as a deoxygenating agent or a stabilizer, to thereby prepare a homogeneous solution.

Alternatively, the gel dosimeter may be produced by the following method. For example, an aqueous dispersion containing the components (B) and (C) and water is added to an aqueous solution containing the component (A), a monomer that can be polymerized through radiation exposure, a crosslinking agent, a sensitizer, an additional component (if desired), and water, and the resultant mixture is heated as appropriate, to thereby prepare a homogeneous solution.

When the gelator used is a natural polymer derived from an animal or a plant, the gel dosimeter may be produced by the following method. For example, a monomer that can be polymerized through radiation exposure, a natural polymer, a crosslinking agent, a sensitizer, and an additional component (if desired) are added to water, and the resultant mixture is heated as appropriate, to thereby prepare a homogeneous solution.

Examples of the method for mixing the respective components include mechanical or manual stirring, ultrasonic stirring, and continuous mixing by line mixing. In particular, mechanical stirring and continuous mixing are preferred.

The mechanical stirring may be performed with, for example, a magnetic stirrer, a propeller-type stirrer, a planetary centrifugal mixer, a disper, a homogenizer, a shaker, a vortex mixer, a ball mill, a kneader, or an ultrasonic oscillator. Of these, a planetary centrifugal mixer is preferably used. The continuous mixing may be performed with, for example, Line Mixer (available from Satake Multimix Corporation), In-Line Mixer (available from Silverson Nippon Limited), Vibro Mixer (available from REICA Co., Ltd.), Static Mixer (available from, for example, Noritake Co., Limited, Japan Flow Controls, Co., Ltd., or Sanyo Seiki Co., Ltd.), Spiral Mixer (available from Japan Flow Controls, Co., Ltd.), FlowMix (available from Mountech Co., Ltd.), or Square Mixer (available from Sakura Seisakusho Ltd.). Of these, Static Mixer is preferably used.

The temperature during mixing is, for example, the freezing point to the boiling point of the aqueous solution or the aqueous dispersion, preferably −5° C. to 100° C., more preferably 0° C. to 50° C.

Although the mixture has low strength and is in the form of sol immediately after completion of the mixing, the mixture gelates after being allowed to stand still. The mixture is preferably allowed to stand still for two hours to 100 hours. The mixture is allowed to stand still at a temperature of −5° C. to 100° C., preferably 0° C. to 30° C.

A preferred combination of the aforementioned water-soluble organic polymer (A), the silicate salt (B), and the dispersant (C) for the silicate salt is, for example, a combination containing the component (A): completely neutralized or partially neutralized linear-chain sodium polyacrylate having a weight average molecular weight of 2,500,000 or more and 5,000,000 or less (0.05% by mass to 10% by mass), the component (B): water-swellable smectite or saponite (0.05% by mass to 10% by mass), and the component (C): sodium pyrophosphate or sodium etidronate (0.5% by mass to 5% by mass) or sodium polyacrylate having a weight average molecular weight of 1,000 or more and 20,000 or less (0.5% by mass to 5% by mass).

[Radiation Dosimeter]

The gel dosimeter of the present invention is suitable for a material for radiation dosimetry. Thus, the radiation dosimetry gel can be charged into a container and used as a radiation dosimeter, for example, a phantom. No particular limitation is imposed on the container, so long as it is insensitive to MRI, allows radiation to transmit therethrough, and has, for example, solvent resistance and air-tightness. Preferred examples of the material of the container include glass, PET, polyethylene, polypropylene, acrylic resin, polyester, and ethylene-vinyl alcohol copolymers. When the container is transparent, a three-dimensional dose distribution can be measured not only with MRI, but also with optical CT capable of three-dimensional measurement of degree of clouding. After the container is charged with the gel, the inside of the container may be replaced with, for example, nitrogen gas.

The gel dosimeter of the present invention prepared through deoxygenation treatment exhibits superior storage stability at room temperature. The gel dosimeter of the present invention exhibits an excellent deoxygenation effect and superior storage stability at room temperature, as compared with a widely used conventional gel dosimeter containing, as a deoxygenating agent, tetrakis(hydroxymethyl) phosphonium chloride, sodium ascorbate, copper sulfate, etc. While such a conventional gel dosimeter is inactivated after two weeks of room temperature storage, the gel dosimeter provided by the present invention undergoes no change in X-ray irradiation sensitivity even after two weeks of room temperature storage.

EXAMPLES

The present invention will next be described in detail by way of Examples, but the present invention should not be construed as being limited to the Examples.

Production Example 1: Production of Aqueous Dispersion of Silicate Salt 14.4 parts of SUMECTON SWF (available from Kunimine Industries Co., Ltd.) was mixed with 1.5 parts of disodium etidronate hydrate (available from Tokyo Chemical Industry Co., Ltd.) and 84.1 parts of water, and the mixture was stirred at 25° C. until a homogeneous aqueous dispersion was prepared, to thereby produce a target product.

Production Example 2: Production of Aqueous Solution of Highly-Polymerized Sodium Polyacrylate 4 parts of highly-polymerized sodium polyacrylate (available from FUJIFILM Wako Pure Chemical Corporation, degree of polymerization: 22,000 to 70,000) was mixed with 1.6 parts of magnesium chloride hexahydrate and 94.4 parts by water, and the mixture was stirred at 25° C. until a homogeneous aqueous solution was prepared, to thereby produce a target product.

Example 1: Production of Gel Dosimeter Containing Gelatin as Gelator 3 parts of N,N'-methylenebisacrylamide (available from FUJIFILM Wako Pure Chemical Corporation), 5 parts of gelatin (available from Sigma-Aldrich), 8 parts of N-vinylpyrrolidone (available from Tokyo Chemical Industry Co., Ltd.), 1 part of glucose (available from JUNSEI CHEMICAL CO., LTD.), and 10 ppm of glucose oxidase (available from Tokyo Chemical Industry Co., Ltd.) were added to 88 parts of water, and the mixture was heated at 45° C. to 50° C. and stirred until homogeneity was achieved. The resultant mixture was charged into a 15 mL PET container, and then allowed to stand still at 20° C. to 25° C. for 24 hours, to thereby prepare a target product for X-ray irradiation experiment.

Example 2: Production of Gel Dosimeter Containing Water-Soluble Organic Polymer, Silicate Salt, and Dispersant for Silicate Salt as Gelator 3 parts of N,N'-methylenebisacrylamide (available from FUJIFILM Wako Pure Chemical Corporation), 1.5 parts of N,N-dimethylacrylamide (available from Tokyo Chemical Industry Co., Ltd.), 1 part of glucose (available from JUN-SEI CHEMICAL CO., LTD.), and 10 ppm of glucose oxidase (available from Tokyo Chemical Industry Co., Ltd.) were added to 66.5 parts of water, and the mixture was stirred at 20° C. to 25° C. until homogeneity was achieved. To the mixture was added 11 parts of the aqueous solution of highly-polymerized sodium polyacrylate produced in Production Example 2, and the resultant mixture was stirred at 20° C. to 25° C. until homogeneity was achieved. To the mixture was added 11 parts of the aqueous dispersion of silicate salt produced in Production Example 1, and the resultant mixture was stirred at 20° C. to 25° C. for three minutes. The resultant mixture was charged into a 15 mL PET container, and then allowed to stand still at 20° C. to 25° C. for 24 hours, to thereby prepare a target product for X-ray irradiation experiment.

Experimental Example 1: X-Ray Irradiation Experiment of Gel Dosimeter

Figure 1:
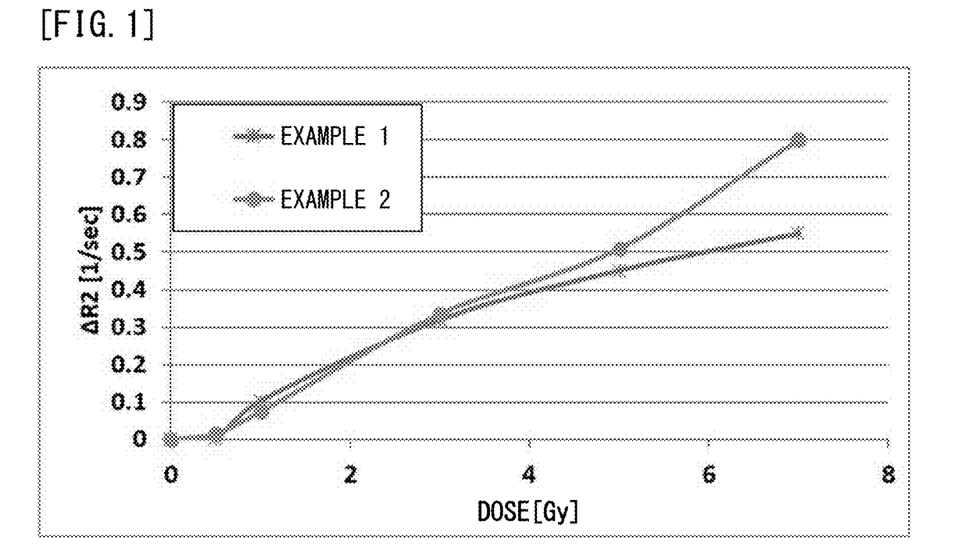
FIG. 1 is a graph showing the correlation between $\Delta R_2$ and irradiated X-ray dose in Examples 1 and 2.
Figure 2:
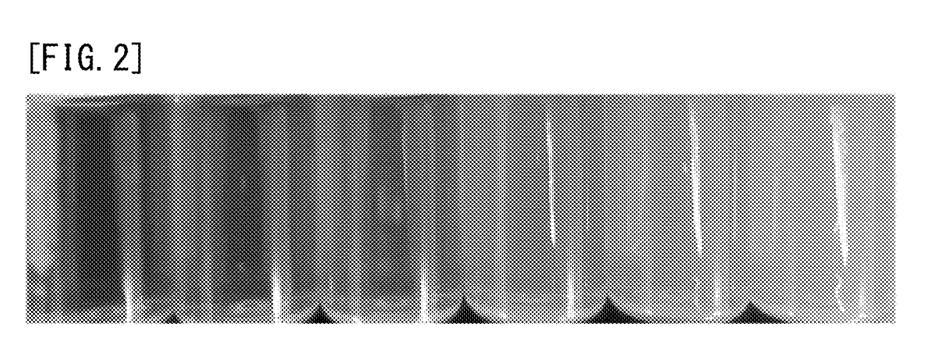
FIG. 2 shows the state of a dosimeter after X-ray irradiation in Example 1; i.e., the state after irradiation of 0, 0.5, 1, 3, 5, and 7 Gy (from left to right).
Figure 3:
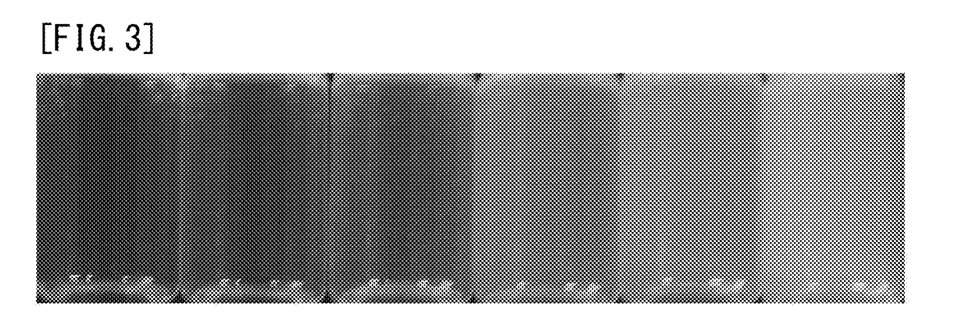
FIG. 3 shows the state of a dosimeter after X-ray irradiation in Example 2; i.e., the state after irradiation of 0, 0.5, 1, 3, 5, and 7 Gy (from left to right).

The gel dosimeter sample prepared in Example 1 or Example 2 was irradiated with X-rays with an X-ray irradiation apparatus (MBR-1520R-4, available from Hitachi Power Solutions Co., Ltd.). Specifically, the sample was irradiated with X-rays at 0.5, 1, 3, 5, or 7 Gy under the following conditions: tube voltage: 150 kV, tube current: 20 mA. The irradiated sample was analyzed by MRI using 3T MRI (Prisma, available from Siemens). Mixed turbo spin echo sequence was applied as a pulsed magnetic field for analysis, and the $T_2$ relaxation time of the sample was acquired to thereby calculate $R_2$ (i.e., $1/T_2$) and $\Delta R_2$ (taking $R_2$ of non-irradiated sample as 0). FIG. 1 is a graph showing the correlation between $\Delta R_2$ and irradiated X-ray dose in Examples 1 and 2. FIG. 2 shows the state of the dosimeter after X-ray irradiation (Example 1: 0, 0.5, 1, 3, 5, and 7 Gy irradiation (from left to right)), and FIG. 3 shows the state of the dosimeter after X-ray irradiation (Example 2: 0, 0.5, 1, 3, 5, and 7 Gy irradiation (from left to right)).

Example 3: Production of Gel Dosimeter Containing Glucose and Glucose Oxidase as Deoxygenating Agent 1.5 parts of N,N'-methylenebisacrylamide (available from FUJIFILM Wako Pure Chemical Corporation), 1.5 parts of N,N-dimethylacrylamide (available from Tokyo Chemical Industry Co., Ltd.), 6 parts of 4-acryloylmorpholine (available from Tokyo Chemical Industry Co., Ltd.), 20 parts of SNOWTEX ST-OXS (available from Nissan Chemical Corporation, solid content concentration: 10%), 1 part of glucose (available from JUNSEI CHEMICAL CO., LTD.), and 10 ppm of glucose oxidase (available from Tokyo Chemical Industry Co., Ltd.) were added to 70 parts of water, and the mixture was stirred at 20° C. to 25° C. until homogeneity was achieved. To the mixture was added 11 parts of the aqueous solution of highly-polymerized sodium polyacrylate produced in Production Example 2, and the resultant mixture was stirred at 20° C. to 25° C. until homogeneity was achieved. To the mixture was added 11 parts of the aqueous dispersion of silicate salt produced in Production Example 1, and the resultant mixture was stirred at 20° C. to 25° C. for three minutes. The resultant mixture was charged into a mL PET container, and then allowed to stand still at 20° C. to 25° C. for 24 hours, to thereby prepare a target product for X-ray irradiation experiment.

Production Example 3: Production of Aqueous Dispersion of Silicate Salt 6 parts of LAPONITE XLG (available from BYK Additives & Instruments) were mixed with 1.7 parts of 35% aqueous solution of lowly-polymerized sodium polyacrylate (average molecular weight: 15,000, available from Sigma-Aldrich), 10 parts of glycerin, parts of citric acid monohydrate, and 81.8 parts of water, and the mixture was stirred with a magnetic stirrer at 25° C. until a homogeneous aqueous dispersion was prepared, to thereby produce a target product.

Production Example 4: Production of Aqueous Solution of Highly-Polymerized Sodium Polyacrylate 2 parts of highly-polymerized sodium polyacrylate (available from FUJIFILM Wako Pure Chemical Corporation, degree of polymerization: 22,000 to 70,000) was mixed with 10 parts of glycerin, 1 part of trisodium citrate dihydrate, 0.5 parts of citric acid monohydrate, and 86.5 parts of water, and the mixture was stirred with a magnetic stirrer at 25° C. until a homogeneous aqueous solution was prepared, to thereby produce a target product.

Comparative Example 1: Production of Gel Dosimeter Containing Water-Soluble Organic Polymer, Silicate Salt, and Dispersant for Silicate Salt as Gelator 3 parts of N,N'-methylenebisacrylamide (available from FUJIFILM Wako Pure Chemical Corporation), 8 parts of N-vinyl-2-pyrrolidone (available from Tokyo Chemical Industry Co., Ltd.), and 200 ppm of hydroquinone were added to 65.8 parts of water, and the mixture was stirred at 20° C. to 25° C. until homogeneity was achieved. To the mixture were added 11 parts of the aqueous solution of highly-polymerized sodium polyacrylate produced in Production Example 4, and 1.2 parts (corresponding to 50 mM) of 80% aqueous solution of tetrakis(hydroxymethyl)-phosphonium chloride (available from Tokyo Chemical Industry Co., Ltd.), and the resultant mixture was stirred. The mixture was cooled to 5° C. or lower, and then 11 parts of the aqueous dispersion of silicate salt produced in Production Example 3 was added to the mixture, followed by stirring for one minute. The resultant mixture was charged into a 30 mL PET container, and then allowed to stand still at 20° C. to 25° C. for 24 hours, to thereby prepare a target product for X-ray irradiation experiment.

Experimental Example 2: Room Temperature Storage Experiment

Figure 4:
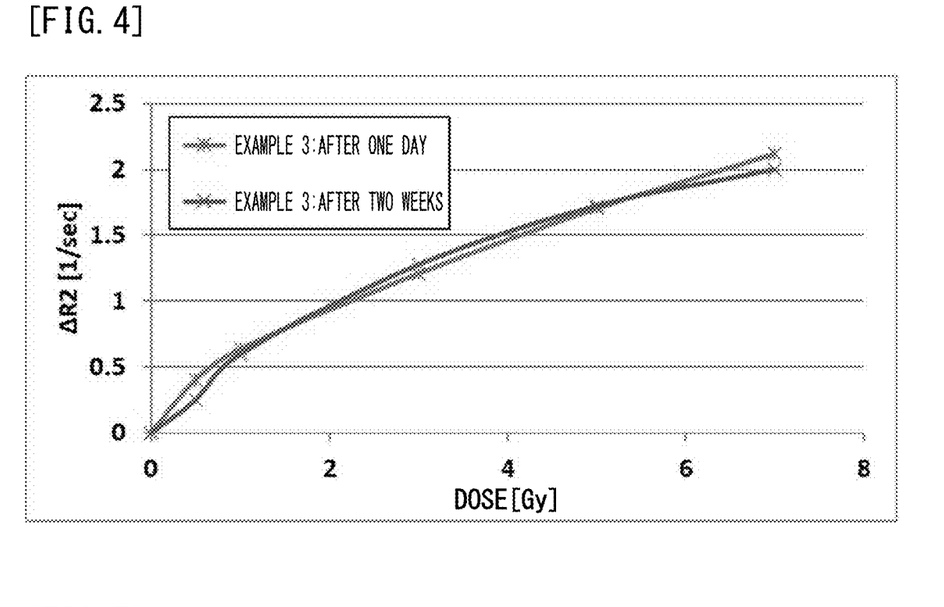
FIG. 4 is a graph showing the correlation between $\Delta R_2$ and irradiated X-ray dose in Example 3 after one day and after two weeks.
Figure 5:
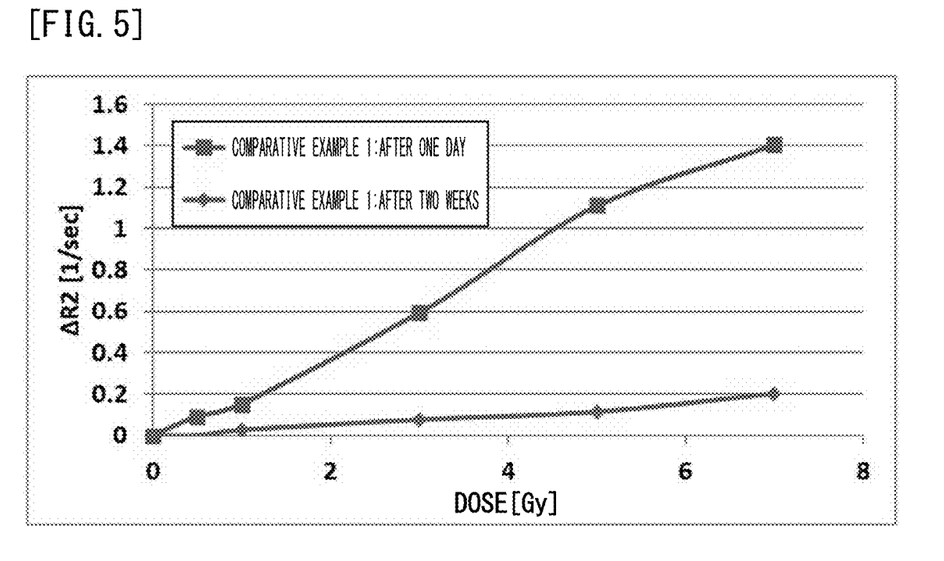
FIG. 5 is a graph showing the correlation between $\Delta R_2$ and irradiated X-ray dose in Comparative Example 1 after one day and after two weeks.

Target products prepared in Example 3 and Comparative Example 1 were irradiated with X-rays in the same manner as in Experimental Example 1 one day after preparation of the products. Separately prepared target products of Example 3 and Comparative Example 1 were allowed to stand still in a room at a temperature of 23° C. to 25° C. for two weeks, and then the target products were irradiated with X-rays in the same manner as in Experimental Example 1. Each of the irradiated samples was analyzed in the same manner as in Experimental Example 1, to thereby calculate $\Delta R_2$. FIG. 4 is a graph showing the correlation between $\Delta R_2$ and irradiated X-ray dose in Example 3 after one day and after two weeks. FIG. 5 is a graph showing the correlation between $\Delta R_2$ and irradiated X-ray dose in Comparative Example 1 after one day and after two weeks. As indicated by the comparison between the results shown in FIG. 4 and FIG. 5, a conventional gel dosimeter containing tetrakis (hydroxymethyl)phosphonium chloride as a deoxygenating agent was almost completely inactivated after two weeks of room temperature storage, whereas the gel dosimeter of the present invention containing glucose and glucose oxidase as a deoxygenating agent underwent no change in X-ray irradiation sensitivity even after two weeks of room temperature storage. Thus, the gel dosimeter of the present invention was found to exhibit superior room temperature storage stability.

INDUSTRIAL APPLICABILITY

The gel dosimeter of the present invention for a radiation dosimeter can be readily produced from industrially easily available raw materials, and exhibits excellent irradiation sensitivity, linearity, and storage stability. Thus, the gel dosimeter can be applied to various radiation therapies.

The invention claimed is:

1. A gel dosimeter for radiation dosimetry comprising: a radically polymerizable monomer, a gelator, glucose, and glucose oxidase.

2. The gel dosimeter for radiation dosimetry according to claim 1, wherein the gelator is one or more selected from the group consisting of: gelatin, agarose, xanthan gum, carrageenan, gellan gum, chitosan, alginic acid, sodium, potassium, magnesium, and calcium salts thereof, including partially neutralized products thereof.

3. The gel dosimeter for radiation dosimetry according to claim 1, wherein the gelator contains polyvinyl alcohol and glutaraldehyde, or borax.

4. The gel dosimeter for radiation dosimetry according to claim 1, wherein the gelator contains a water-soluble organic polymer having an organic acid structure, an organic acid salt structure, or an organic acid anion structure, a silicate salt, and a dispersant for the silicate salt.

5. The gel dosimeter for radiation dosimetry according to claim 4, wherein the water-soluble organic polymer is a completely neutralized or partially neutralized polyacrylic acid salt having a weight average molecular weight of 1,000,000 to 10,000,000, or a mixture thereof.

6. The gel dosimeter for radiation dosimetry according to claim 4, wherein the silicate salt is one or more water-swellable silicate salts selected from the group consisting of smectite, bentonite, vermiculite, and mica.

7. The gel dosimeter for radiation dosimetry according to claim 4, wherein the dispersant is one or more selected from the group consisting of sodium orthophosphate, sodium pyrophosphate, sodium tripolyphosphate, sodium tetraphosphate, sodium hexametaphosphate, sodium polyphosphate, sodium etidronate, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, sodium ligninsulfonate, and potassium salts corresponding to these salts.

8. The gel dosimeter for radiation dosimetry according to claim 1, wherein the radically polymerizable monomer is a water-soluble polymerizable monomer.

9. The gel dosimeter for radiation dosimetry according to claim 1, which further comprises a water-soluble polyfunctional acrylamide monomer as a crosslinking agent.

10. The gel dosimeter for radiation dosimetry according to claim 1, which further comprises water-dispersible inorganic microparticles as a sensitizer.

11. The gel dosimeter for radiation dosimetry according to claim 1, which further comprises, a polymerization inhibitor, a radical scavenger, or an antioxidant as a stabilizer.

12. The gel dosimeter for radiation dosimetry according to claim 1, which further comprises a buffer.

13. The gel dosimeter for radiation dosimetry according to claim 12, wherein the buffer is one or more acids selected from the group consisting of phosphoric acid, citric acid, acetic acid, boric acid, tartaric acid, salts of these acids, Tris, and HEPES.

* * * * *